(12) United States Patent
Choby

(10) Patent No.: US 8,374,757 B2
(45) Date of Patent: *Feb. 12, 2013

(54) CONTROL SYSTEM AND METHOD TO INHIBIT AUTOMATIC TRANSMISSION DOWNSHIFTING DURING TRAILER SWAY

(75) Inventor: Jordan Choby, Huntington Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,878

(22) Filed: Oct. 21, 2011

(65) Prior Publication Data

US 2012/0041653 A1   Feb. 16, 2012

Related U.S. Application Data

(63) Continuation of application No. 12/408,476, filed on Mar. 20, 2009, now Pat. No. 8,060,288.

(51) Int. Cl.
*G06F 7/00* (2006.01)
(52) U.S. Cl. ......................................................... 701/51
(58) Field of Classification Search .................. 701/48, 701/51, 70, 72, 74, 95
See application file for complete search history.

(56) References Cited

U.S. PATENT DOCUMENTS

| | | | |
|---|---|---|---|
| 3,665,779 A | 5/1972 | Mori | |
| 4,164,876 A | 8/1979 | Peppel | |
| 4,254,998 A | 3/1981 | Marshall et al. | |
| 4,592,565 A | 6/1986 | Eagle | |
| 4,598,611 A | 7/1986 | Frank | |
| 4,841,815 A | 6/1989 | Takahashi | |
| 4,884,648 A | 12/1989 | Uchida et al. | |
| 4,958,695 A | 9/1990 | Uchida et al. | |
| 5,099,720 A | 3/1992 | Raue | |
| 5,233,523 A | 8/1993 | Follmer | |
| 5,413,541 A | 5/1995 | Nasset | |
| 5,444,307 A | 8/1995 | Sheets et al. | |
| 5,459,658 A | 10/1995 | Morey et al. | |
| 5,717,592 A | 2/1998 | Oo et al. | |
| 5,857,937 A | 1/1999 | Ashizawa et al. | |
| 5,913,916 A | 6/1999 | Bai et al. | |
| 5,957,255 A | 9/1999 | Grytzelius | |
| 6,042,196 A | 3/2000 | Nakamura et al. | |
| 6,067,493 A | 5/2000 | Adachi et al. | |
| 6,076,622 A | 6/2000 | Chakraborty | |
| 6,128,565 A | 10/2000 | Tsutsui et al. | |

(Continued)

FOREIGN PATENT DOCUMENTS

| | | |
|---|---|---|
| EP | 425276 | 10/1990 |
| JP | 2000-043705 | 2/2000 |

(Continued)

OTHER PUBLICATIONS

RD 323100.

*Primary Examiner* — Kim T Nguyen
(74) *Attorney, Agent, or Firm* — Snell & Wilmer, LLP

(57) ABSTRACT

A control system for a vehicle that is towing a trailer, the control system including a lateral acceleration sensor coupled to the vehicle for determining a lateral acceleration of the vehicle caused by the trailer swaying and generating a lateral acceleration signal based on the lateral acceleration of the vehicle and a transmission controller for receiving the lateral acceleration signal from the lateral acceleration sensor, comparing the lateral acceleration signal to a threshold, and prohibiting a gear switch signal from being transmitted to a transmission of the vehicle when the lateral acceleration signal exceeds the threshold.

20 Claims, 3 Drawing Sheets

U.S. PATENT DOCUMENTS

| | | | |
|---|---|---|---|
| 6,205,387 B1 | 3/2001 | Ochiai | |
| 6,440,037 B2 | 8/2002 | Takagi et al. | |
| 6,442,467 B1 | 8/2002 | Schuler et al. | |
| 6,461,261 B2 | 10/2002 | Yamamoto et al. | |
| 6,466,851 B2 | 10/2002 | Kato et al. | |
| 6,478,713 B1 | 11/2002 | Runde et al. | |
| 6,496,771 B2 | 12/2002 | Hattori et al. | |
| 6,516,260 B2 | 2/2003 | Wetzel et al. | |
| 6,516,664 B2 | 2/2003 | Lynam | |
| 6,523,911 B1 | 2/2003 | Rupp et al. | |
| 6,524,216 B2 | 2/2003 | Suzuki et al. | |
| 6,584,391 B2 | 6/2003 | Lack | |
| 6,662,098 B2 | 12/2003 | Hellmann et al. | |
| 6,668,225 B2 | 12/2003 | Oh et al. | |
| 6,726,594 B2 | 4/2004 | Mizuno et al. | |
| 6,821,228 B2 | 11/2004 | Aoki et al. | |
| 6,823,250 B2 | 11/2004 | Yamaguchi et al. | |
| 6,957,139 B2 | 10/2005 | Bellinger | |
| 6,968,736 B2 | 11/2005 | Lynam | |
| 6,995,663 B2 | 2/2006 | Geisler et al. | |
| 7,113,860 B2 | 9/2006 | Wang | |
| 7,139,650 B2 | 11/2006 | Lubischer | |
| 7,177,743 B2 | 2/2007 | Roy | |
| 7,226,134 B2 | 6/2007 | Horn et al. | |
| 7,272,481 B2 | 9/2007 | Einig et al. | |
| 7,302,332 B2 | 11/2007 | Nenninger | |
| 7,303,505 B2 | 12/2007 | Kanafani et al. | |
| 7,392,120 B2 | 6/2008 | Matsumoto et al. | |
| 7,393,305 B2 | 7/2008 | Yamada et al. | |
| 7,447,583 B2 | 11/2008 | Ogawa | |
| 7,548,810 B2 | 6/2009 | Akoi | |
| 7,568,996 B2 | 8/2009 | Matsui et al. | |
| 7,582,041 B2 | 9/2009 | Suzuki et al. | |
| 8,060,288 B2 * | 11/2011 | Choby | 701/70 |
| 2005/0049772 A1 | 3/2005 | Liu | |
| 2005/0051133 A1 | 3/2005 | Persson et al. | |
| 2006/0041355 A1 | 2/2006 | Blundell et al. | |
| 2006/0261980 A1 | 11/2006 | Beier | |
| 2007/0260385 A1 | 11/2007 | Tandy, Jr. et al. | |
| 2007/0266700 A1 | 11/2007 | Lang et al. | |
| 2008/0027613 A1 | 1/2008 | Bai et al. | |
| 2008/0032858 A1 | 2/2008 | Frank et al. | |
| 2008/0036296 A1 | 2/2008 | Wu et al. | |
| 2008/0147277 A1 | 6/2008 | Lu et al. | |
| 2008/0172163 A1 | 7/2008 | Englert et al. | |
| 2008/0312030 A1 | 12/2008 | Kurita et al. | |
| 2009/0018736 A1 | 1/2009 | Kuwahara | |
| 2009/0043468 A1 | 2/2009 | Kondo et al. | |
| 2009/0072997 A1 | 3/2009 | Shrum, Jr. | |
| 2009/0088938 A1 | 4/2009 | Usukura | |
| 2009/0093936 A1 | 4/2009 | Lindgren et al. | |
| 2009/0118095 A1 | 5/2009 | Tabata et al. | |
| 2009/0157269 A1 | 6/2009 | Matsubara et al. | |
| 2009/0219394 A1 | 9/2009 | Heslin | |
| 2009/0233765 A1 * | 9/2009 | Tao et al. | 477/127 |
| 2009/0236159 A1 | 9/2009 | Shibata et al. | |
| 2009/0240405 A1 | 9/2009 | Tawara | |
| 2009/0250278 A1 | 10/2009 | Kawasaki et al. | |

FOREIGN PATENT DOCUMENTS

| | | |
|---|---|---|
| JP | 2000-272381 | 10/2000 |
| JP | 2001088683 | 4/2001 |

* cited by examiner

CONTROL SYSTEM AND METHOD TO INHIBIT AUTOMATIC TRANSMISSION DOWNSHIFTING DURING TRAILER SWAY

CROSS REFERENCE TO RELATED APPLICATIONS

This application is a continuation application of U.S. patent application Ser. No. 12/408,476, filed on Mar. 20, 2009, the entire contents of which is incorporated herein by reference.

BACKGROUND

1. Field

The invention relates to systems and methods for improving the safety of a vehicle that is pulling a trailer. More particularly, the invention relates to a control system and method to inhibit automatic transmission downshifting during trailer sway.

2. Background

Trailers, such as mobile homes, travel trailers, campers and the like, are conventionally equipped with electrically appliable brakes which may be operated by the driver in the towing vehicle. When pulling the trailer, a dangerous driving situation known as trailer sway may occur and can be inhibited by momentary application of the trailer brakes. Such momentary application results from briefly energizing the brake-actuating coils by means of manually or automatically operable devices.

Trailer sway may occur while applying braking of the towing vehicle without braking or balanced braking of the trailer. Trailer sway may also occur during a cross-wind from traffic or when traveling on a windy highway. A rapid turn of the steering wheel of the towing vehicle can also cause trailer sway.

Trailer sway can be mitigated by applying braking to the trailer without applying braking to the towing vehicle. Trailer sway can also be mitigated by accelerating the towing vehicle to pull the trailer to straighten out. These techniques, however, can still result in a dangerous driving situation.

Therefore, a need exists in the art for a control system and method that overcomes the drawbacks of the prior art.

SUMMARY

A control system for a vehicle that is towing a trailer, the control system including a lateral acceleration sensor coupled to the vehicle for determining a lateral acceleration of the vehicle caused by the trailer swaying and generating a lateral acceleration signal based on the lateral acceleration of the vehicle and a transmission controller for receiving the lateral acceleration signal from the lateral acceleration sensor, comparing the lateral acceleration signal to a threshold, and prohibiting a gear switch signal from being transmitted to a transmission of the vehicle when the lateral acceleration signal exceeds the threshold.

A control system for a vehicle that is towing a trailer including a lateral acceleration sensor for generating a lateral acceleration signal based on a lateral acceleration of a vehicle caused by the trailer swaying and a yaw rate sensor for generating a yaw signal based on an angular velocity of the vehicle. The control system also includes a stability control system for receiving the lateral acceleration signal and the yaw signal, comparing the lateral acceleration signal to a first threshold value, comparing the yaw signal to a second threshold value, and generating a prohibit downshift signal when the lateral acceleration signal exceeds the first threshold value or when the yaw signal exceeds the second threshold value. The control system also includes a transmission controller for receiving the prohibit downshift signal from the stability control system and transmitting a prohibit downshift signal to a transmission of the vehicle to prevent a mechanical or electrical change of a gear of the transmission.

A method of controlling vehicle stability during trailer sway, the method including receiving from a lateral acceleration sensor a lateral acceleration signal measuring a lateral acceleration of a vehicle, receiving from a yaw sensor a yaw signal measuring an angular velocity of the vehicle, and generating a prohibit downshift signal when the lateral acceleration signal exceeds a first threshold value or when the yaw signal exceeds a second threshold value.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Apparatus, systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements.

Figure 1:
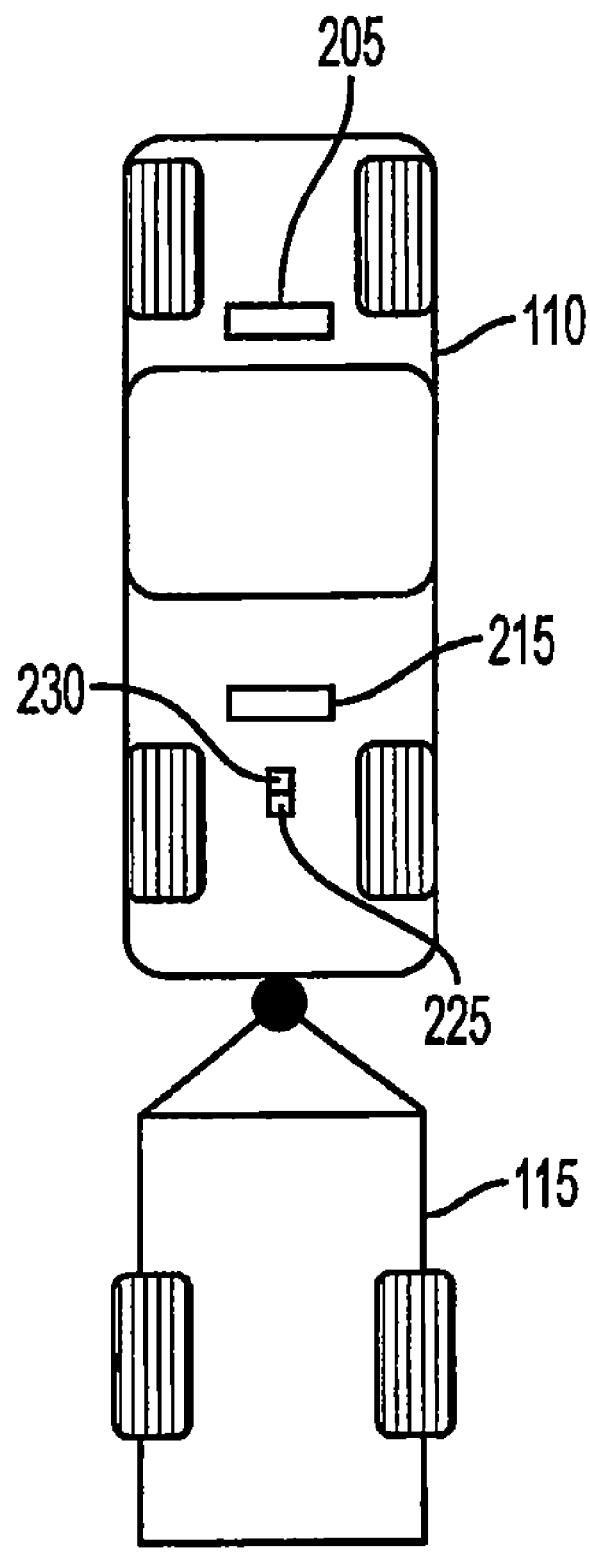
FIG. 1 is a schematic diagram of a vehicle towing a trailer.

FIG. 1 is a schematic diagram of a vehicle 110 towing a trailer 115. Trailer sway often occurs to the trailer 115 while being towed by the vehicle 110 when the trailer's stability is disturbed. Trailer sway can be defined as a lateral movement of the trailer 115, which causes instability. When the trailer 115 sways, the vehicle 110 may accelerate in lateral directions, which can cause the vehicle 110 to become unstable.

Figure 2:
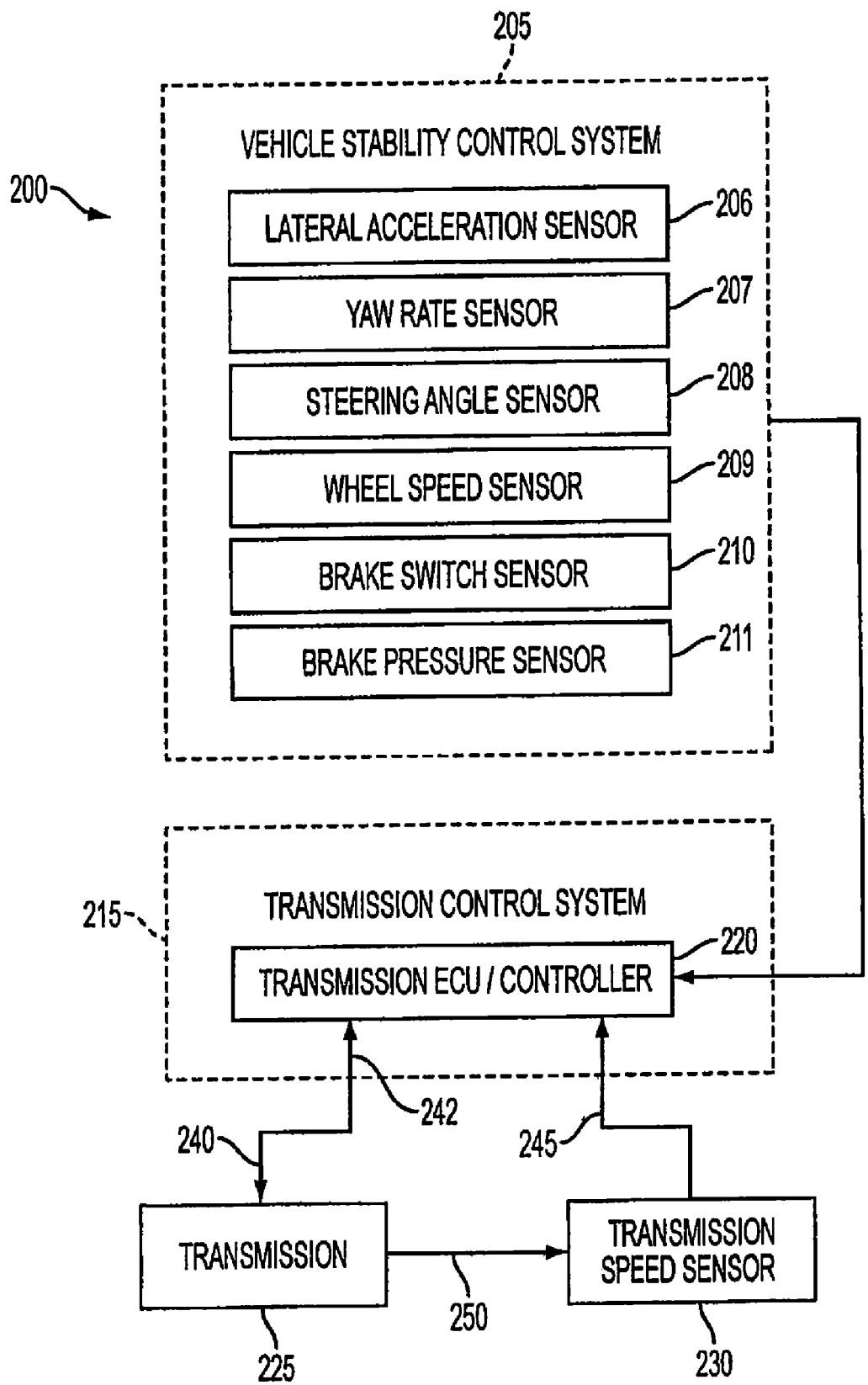
FIG. 2 is a schematic block diagram of a control system for the vehicle that includes a vehicle stability control system and a transmission control system.

FIG. 2 is a schematic block diagram of a control system 200 for the vehicle 110 that includes a vehicle stability control system 205 and a transmission control system 215. The vehicle stability control system 205 and the transmission control system 215 may be implemented using hardware, software, firmware, middleware, microcode, or any combination thereof. The vehicle stability control system 205 and the transmission control system 215 may be a processor, an Advanced RISC Machine (ARM), a controller, a digital signal processor (DSP), a microprocessor, a machine readable medium, any other device capable of processing data, and combinations thereof. The term "machine readable medium" includes, but is not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data.

Referring to FIGS. 1 and 2, the vehicle stability control system 205 may have a lateral acceleration sensor 206, a yaw rate sensor 207, a steering wheel angle sensor 208, a wheel speed sensor 209, a brake switch sensor 210, and a brake pressure sensor 211. The sensors may be wirelessly connected or wire connected to the vehicle stability control system 205.

The lateral acceleration sensor 206 detects or senses any lateral acceleration of the vehicle 110. The lateral acceleration sensor 206 can detect lateral accelerations of the vehicle 110 without the vehicle 110 moving in a lateral direction. The lateral acceleration refers to the lateral force applied to the vehicle 110 rather than the movement of the vehicle 110. Trailer sway refers to the trailer 115 moving back and forth, which causes a lateral force to be applied to or placed on the vehicle 110. The lateral force placed on the vehicle 110 in lateral directions is detected or measured by the lateral acceleration sensor 206 (Force=Mass*Acceleration). The lateral force caused by the trailer sway eventually causes the vehicle 110 to move laterally but at this point in time, the driver may have already lost control of the vehicle 110 and the vehicle 110 may have been forced off the road. The lateral acceleration sensor 206 may detect alternating back and forth forces on the vehicle 110 indicating that the trailer 115 is swaying and may generate a lateral acceleration or force signal indicating a back (e.g., negative) and forth (e.g., positive) acceleration or force on the vehicle 110 for analysis by the vehicle stability control system 205. The lateral acceleration signal is a signal representing lateral acceleration of the vehicle 110 in both opposite directions, which determines sway and intensity of the sway.

The yaw rate sensor 207 determines or measures the vehicle's angular velocity about its vertical axis and generates a yaw signal for analysis by the vehicle stability control system 205. The angular velocity indicates how much the vehicle is rotating or spinning about its vertical axis. When the angular velocity is 0, the vehicle is not rotating or spinning about its vertical axis.

The steering wheel angle sensor 208 determines an angle in which the steering wheel has rotated from a center position. That is, the steering wheel angle sensor 208 determines how much the steering wheel has moved in the left direction or the right direction. When the steering wheel is centered (i.e., the vehicle 110 is moving in a straight forward direction), the steering wheel angle sensor 208 generates a steering wheel angle signal of 0 for analysis by the vehicle stability control system 205.

The wheel speed sensor 209 determines or measures the speed of each wheel and transmits a wheel speed signal for each wheel to the vehicle stability control system 205 for analysis. If the speed of one or more wheels is different from the speed of the other wheels, the vehicle 110 or one or more wheels may be experiencing a skid or a spin.

The brake sensor 210 determines whether the brakes of the vehicle 110 are being applied by the driver. If the brakes are being applied, the brake sensor 210 generates an on signal and if the brakes are not being applied, the brake sensor 210 generates an off signal. The brake signal is sent to the vehicle stability control system 205.

The brake pressure sensor 211 determines or measures the amount of force or pressure being applied to the brakes and generates a brake pressure signal for analysis by the vehicle stability control system 205.

The vehicle stability control system 205 receives the lateral acceleration signal, the yaw signal, the steering wheel angle signal, the wheel speed signals, the brake signal, and the brake pressure signal. The vehicle stability control system 205 compares each of the signals to a normal threshold. If one or more of the signals exceeds its normal threshold, the vehicle 110 may be in an unstable situation. For example, if the lateral acceleration signal exceeds a normal threshold, the vehicle stability control system 205 may determine that trailer sway is occurring. The vehicle stability control system 205 may receive alternating lateral acceleration signals from the lateral acceleration sensor 206 indicating that the vehicle 110 is experiencing a back and forth lateral force caused by trailer sway. In this situation, the vehicle stability control system 205 sends a prohibit downshift signal to the transmission control system 215 of the vehicle 110. Also, if the yaw signal exceeds a normal threshold, the vehicle stability control system 205 sends a prohibit downshift signal to the transmission control signal 215. In one embodiment, trailer sway can be detected if the lateral acceleration signal and the yaw signal exceed respective normal thresholds. If the signals are within their respective normal thresholds, the vehicle stability control system 205 sends an allow downshift signal to the transmission control system 215.

The transmission control system 215 has a transmission controller 220 (e.g., an Electronic Control Unit (ECU)) that is wirelessly connected or wire connected to the vehicle stability control system 205, a transmission 225 of the vehicle 110 and a transmission speed sensor 230. The transmission 225 is an electronically controlled transmission that is configured to send a gear change request 242 to the transmission controller 220. The transmission controller 220 does not send a gear shift signal 240 to the transmission 225 until the transmission controller 220 receives an allow downshift signal from the vehicle stability control system 205. In one embodiment, the transmission controller 220 sends a prohibit downshift signal to the transmission 225 to prevent a mechanical or electrical change of a gear of the transmission 225.

The transmission speed sensor 230 may be wirelessly connected or wire connected to the transmission 225. The transmission speed sensor 230 periodically (e.g., every 1/1000 of a second) determines or senses a speed 250 of the transmission 225, generates a transmission speed signal 245 representing the speed 250 of the transmission 225 and sends the transmission speed signal 245 to the transmission controller 220.

The transmission controller 220 receives the gear change request 242 from the transmission 225, the transmission speed signal 245 from the transmission speed sensor 230, and the downshift signal (i.e., allow or prohibit) from the vehicle stability control system 205. The transmission controller 220 uses the gear change request 242, the transmission speed signal 245, and the downshift signal to determine whether or not to send an upshift signal 240 or a downshift signal 240 to the transmission 225. For example, if the prohibit downshift signal is received from the vehicle stability control system 205, the transmission controller 220 will not send a gear shift signal 240 to the transmission 225. The transmission controller 220 prevents downshifting of the transmission 225 during trailer sway to eliminate any other vehicle factors that can intensify the sway and make the situation more dangerous.

If the transmission controller 220 receives the allow downshift signal from the vehicle stability control system 205 and receives the gear change request 242, the transmission controller 220 will determine whether or not to send a gear shift signal 240 to the transmission 225 based on the transmission speed signal 245. The transmission controller 220 may also determine to send a gear shift signal 240 to the transmission 225 based on the transmission speed signal 245 regardless of whether the transmission controller 220 received the gear change request 242 from the transmission 225 as long as the prohibit downshift signal is not received from the vehicle stability control system 205. Upon receipt of the upshift signal 240 or the downshift signal 240, the transmission 225 will force a mechanical change of a gear to the transmission 225.

Figure 3:
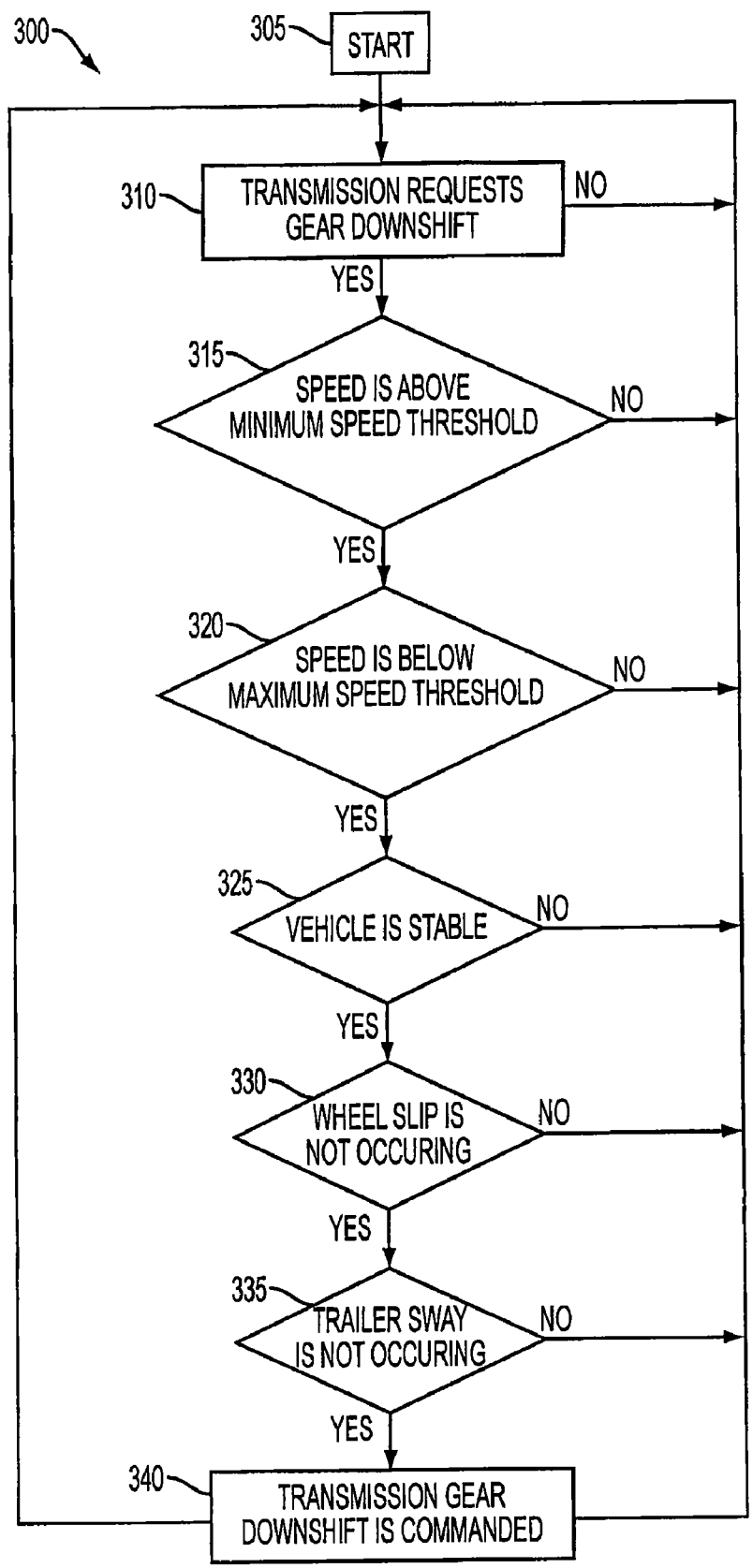
FIG. 3 is a flow chart of a method of controlling vehicle stability during trailer sway.

FIG. 3 is a flow chart of a method 300 of controlling vehicle stability during trailer sway. The method begins at step 305. At step 310, the transmission controller 220 is waiting for a gear change request 242 (e.g., a downshift request) from the transmission 225. Upon receiving the gear change request 242, the transmission controller 220 determines whether the transmission speed signal 245 is above a minimum speed threshold for the current gear (step 315). If no, the method returns to step 305. If yes, the transmission controller 220 determines whether the transmission speed signal 245 is below a maximum speed threshold for the current gear (step 320). If no, the method returns to step 305.

At step 325, the transmission controller 220 determines whether the vehicle 110 is stable based on the allow downshift signal or the prohibit downshift signal. The allow downshift signal indicates that the vehicle 110 is stable and the prohibit downshift signal indicates that the vehicle 110 is not stable. The vehicle stability control system 205 analyzes the vehicle's stability through one or more sensors 206-211 by comparing the signals generated from these sensors to predetermined normal thresholds, which indicate stability of the vehicle 110. In one embodiment, the vehicle stability control system 205 analyzes the vehicle's stability by analyzing only the lateral acceleration signal and/or the yaw rate signal and determining whether the vehicle is stable based on only one or two signals.

At step 330, the transmission controller 220 determines whether wheel slip is occurring based on monitoring the individual wheel speed sensors 209. The wheel speed sensors 209 determine or measure how fast each wheel is spinning. If the transmission controller 220 determines that one or more wheels have stopped and one or more wheels have not stopped, the vehicle 110 is skidding. If the transmission controller 220 determines that one or more wheels are spinning faster than the other wheels, the wheels are spinning out.

At step 335, the transmission controller 220 determines whether trailer sway is occurring by analyzing one or more signals from the sensors 206-211 that have not been previously analyzed. For example, the transmission controller 220 may analyze the steering wheel angle signal, the brake signal, and the brake pressure signal, and compare these signals to their respective normal thresholds to determine whether trailer sway is occurring.

If trailer sway is not occurring, the transmission controller 220 sends a gear change request 242 (i.e., a downshift request) to the transmission 225 (step 340).

Those of ordinary skill would appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A control system for a vehicle towing an object comprising:
    a sensor configured to sense a lateral force applied to the vehicle by movement of the object being towed by the vehicle and generate a signal based on the sensed lateral force;
    a transmission coupled to the vehicle; and
    a controller coupled to the transmission and receptive to the sensor, the controller configured to compare the signal from the sensor to a predetermined value and prohibit a change of a gear of the transmission based upon the comparison of the signal to the predetermined value.

2. The control system of claim 1 wherein the controller is configured to allow a gear shift signal to be sent to the transmission if the signal from the sensor does not exceed the predetermined value.

3. The control system of claim 2 wherein the controller is configured to prohibit the gear shift signal from being generated if the signal from the sensor exceeds the predetermined value.

4. The control system of claim 1 wherein the controller is configured to prohibit a gear shift signal from being sent to the transmission if the signal from the sensor exceeds the predetermined value.

5. A control system for a vehicle towing an object comprising:
    a lateral acceleration sensor configured to sense a lateral acceleration of the vehicle caused by movement of the object and generate a lateral acceleration signal based on the sensed lateral acceleration of the vehicle;
    a first controller configured to receive the lateral acceleration signal from the lateral acceleration sensor and compare the lateral acceleration signal to a first threshold, the first controller configured to generate a first signal based upon the comparison of the lateral acceleration signal to the first threshold; and
    a second controller configured to receive the first signal from the first controller, the second controller configured to generate a gear shift signal or transmit the gear shift signal to a transmission of the vehicle based upon the first signal.

6. The control system of claim 5 wherein:
    the first signal is a prohibit signal generated by the first controller if the lateral acceleration signal exceeds the first threshold, and
    the second controller is configured to generate the gear shift signal or transmit the gear shift signal to the transmission of the vehicle only if the first controller is not generating the prohibit signal.

7. The control system of claim 5 wherein:
    the first signal is an allow signal generated if the lateral acceleration signal does not exceed the first threshold, and
    the second controller is configured to generate the gear shift signal or transmit the gear shift signal to the transmission of the vehicle only if the first controller is generating the allow signal.

8. The control system of claim 5 further comprising:
a second sensor coupled to the vehicle and configured to generate a second signal, and
wherein the first controller is configured to receive the second signal from the second sensor and compare the second signal to a second threshold, the first controller configured to generate the first signal based upon the comparison of the lateral acceleration signal to the first threshold or the comparison of the second signal to the second threshold.

9. The control system of claim 5 wherein the lateral acceleration sensor is configured to sense the lateral acceleration of the vehicle before the vehicle moves laterally.

10. The control system of claim 5 further comprising:
a transmission speed sensor configured to generate a transmission speed signal representing a speed of the transmission, the transmission speed sensor configured to transmit the transmission speed signal to the second controller,
wherein the transmission of the vehicle is configured to transmit a gear change request signal to the second controller, and
wherein the second controller transmits the gear shift signal to the transmission of the vehicle based upon the transmission speed signal, the gear change request signal, and the first signal.

11. A method of controlling a vehicle towing an object, the vehicle having a sensor for sensing a characteristic of the vehicle, a controller receptive to the sensor, and a transmission having a gear, the method comprising:
sensing, with the sensor, change in the vehicle's stability based on lateral movement of the object;
generating, with the sensor, a signal based on the sensed change in the vehicle's stability;
receiving, at the controller, the signal from the sensor;
comparing, using the controller, the signal from the sensor to a threshold value; and
prohibiting a change of the gear of the transmission based upon the comparison of the signal to the threshold value.

12. The method of claim 11 further comprising generating, using the controller, a prohibit signal when the signal from the sensor exceeds the threshold value.

13. The method of claim 12 further comprising transmitting the prohibit signal to the transmission for prohibiting the change of the gear of the transmission.

14. The method of claim 12 further comprising:
allowing a gear shift signal to be sent to the transmission if the prohibit signal is not being generated by the controller; and
prohibiting a gear shift signal from being sent to the transmission if the prohibit signal is being generated by the controller.

15. A control system for a vehicle towing a trailer comprising:
a first controller configured to receive a first signal indicating lateral movement of the trailer while the vehicle is towing the trailer and compare the first signal to a threshold, the first controller configured to generate a second signal based upon the comparison of the first signal to the threshold; and
a second controller configured to receive the second signal from the first controller, the second controller configured to prohibit a change of a gear of a transmission of the vehicle upon the second controller receiving the second signal, and to generate a gear shift signal that allows the change of the gear when the second signal is not received by the second controller, and transmit the gear shift signal to the transmission to allow the change of the gear.

16. The control system of claim 15 wherein:
the first signal is received from a sensor configured to sense the lateral movement of the trailer.

17. The control system of claim 15 wherein:
the second controller is a transmission controller, and
the second signal is a prohibit downshift signal.

18. The control system of claim 15 wherein:
the second controller is configured to generate a prohibit downshift signal upon the second controller receiving the second signal and transmit the prohibit downshift signal to the transmission to prohibit downshifting of the transmission.

19. The control system of claim 15 wherein:
the first controller is configured to generate an allow downshift signal based upon the comparison of the first signal to the threshold, and
the second controller is configured to receive the allow downshift signal from the first controller, the second controller configured to generate a downshift signal upon the second controller receiving the allow downshift signal, and transmit the downshift signal to the transmission to allow the transmission to downshift.

20. The control system of claim 19 wherein:
the first controller is configured to compare the first signal to the threshold to determine if the first signal exceeds the threshold, the first controller generating the second signal if the first signal exceeds the threshold or generating the allow downshift signal if the first signal does not exceed the threshold.

* * * * *